United States Patent [19]

Turchan

[11] Patent Number: 5,647,704
[45] Date of Patent: Jul. 15, 1997

[54] MACHINING OPPOSITE SURFACES OF A WORKPIECE TO BE PARALLEL TO ONE ANOTHER

[76] Inventor: Manuel C. Turchan, 42288 Crestview, Northville, Mich. 48167

[21] Appl. No.: 260,544

[22] Filed: Jun. 16, 1994

[51] Int. Cl.⁶ .................................................. B23Q 3/06
[52] U.S. Cl. ........................... 409/131; 269/47; 409/217; 409/903; 451/364
[58] Field of Search ............................. 409/131, 218, 409/221, 225, 227, 132, 903; 269/902, 900, 47, 48, 254 R, 49, 50, 303; 451/364

[56] References Cited

U.S. PATENT DOCUMENTS

| | | | |
|---|---|---|---|
| 4,448,405 | 5/1984 | Cipolla | 269/902 |
| 4,601,110 | 7/1986 | Donaldson | 409/219 X |
| 4,678,169 | 7/1987 | Fishman | 269/903 |
| 4,915,367 | 4/1990 | Carossino | 269/254 R |
| 5,064,321 | 11/1991 | Barnes | 409/219 |
| 5,234,295 | 8/1993 | Jackson et al. | 409/227 |
| 5,375,951 | 12/1994 | Veale | 409/131 |

FOREIGN PATENT DOCUMENTS

| | | | |
|---|---|---|---|
| 209265 | 3/1980 | Germany | 269/47 |
| 100346 | 5/1987 | Japan | 269/903 |
| 601678 | 7/1978 | Switzerland | 269/303 |
| 1613307 | 12/1990 | U.S.S.R. | 409/131 |

Primary Examiner—William Briggs
Attorney, Agent, or Firm—Gerald E. Linden

[57] ABSTRACT

Parallelism between of two opposite surfaces of a workpiece is assured by referencing off of three features on the edge(s) of the workpiece, the three edge features establishing a single, unique plane within the workpiece for referencing the machining operations performed on the two opposite surfaces of the workpiece. The workpiece is held by corresponding two sets of three fixture points, above the surface of two corresponding fixtures, or of one compound fixture, while machining the two opposite surfaces. In this manner, problems associated with referencing off of the first machined surface, to machine the second surface, are completely avoided. This is particularly useful when machining the opposite faces of an automatic transmission valve body. The one set of fixture points is identical to the other set of fixture points, to ensure accurate positioning of the workpiece from fixture-to-fixture (or from set of fixture points to set of fixture points, in a compound fixture).

25 Claims, 7 Drawing Sheets

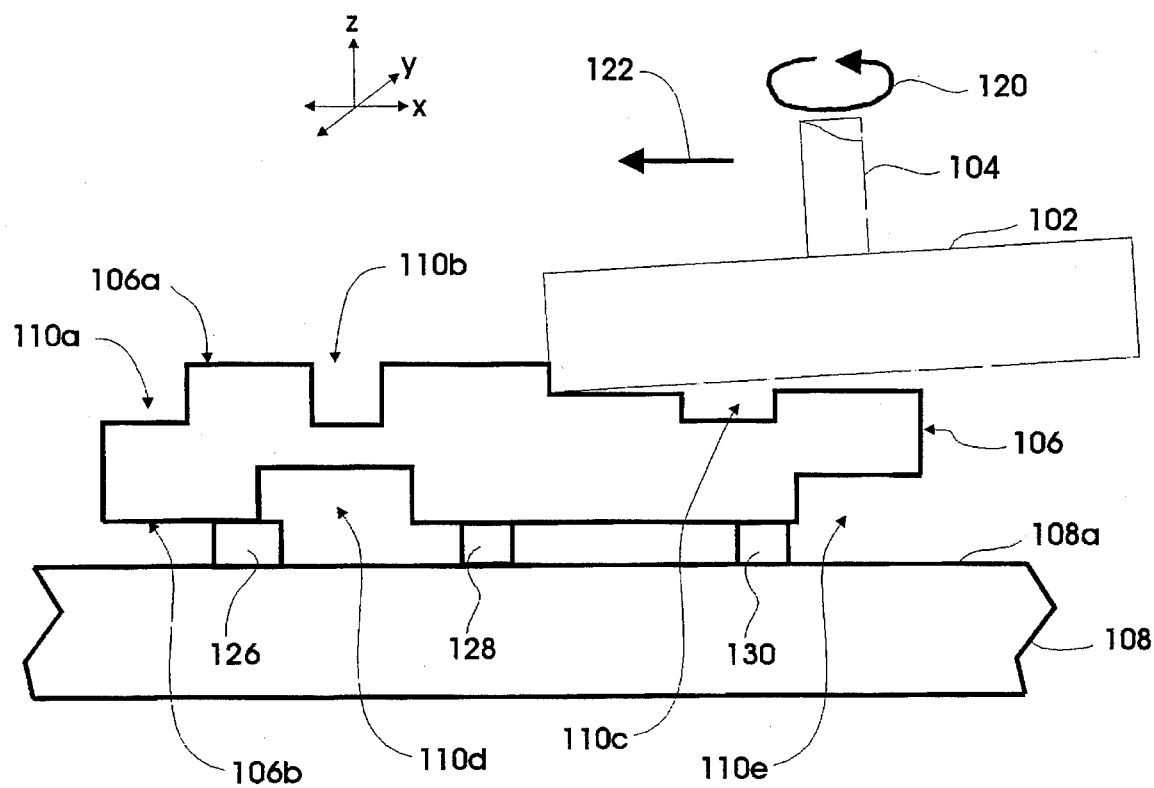

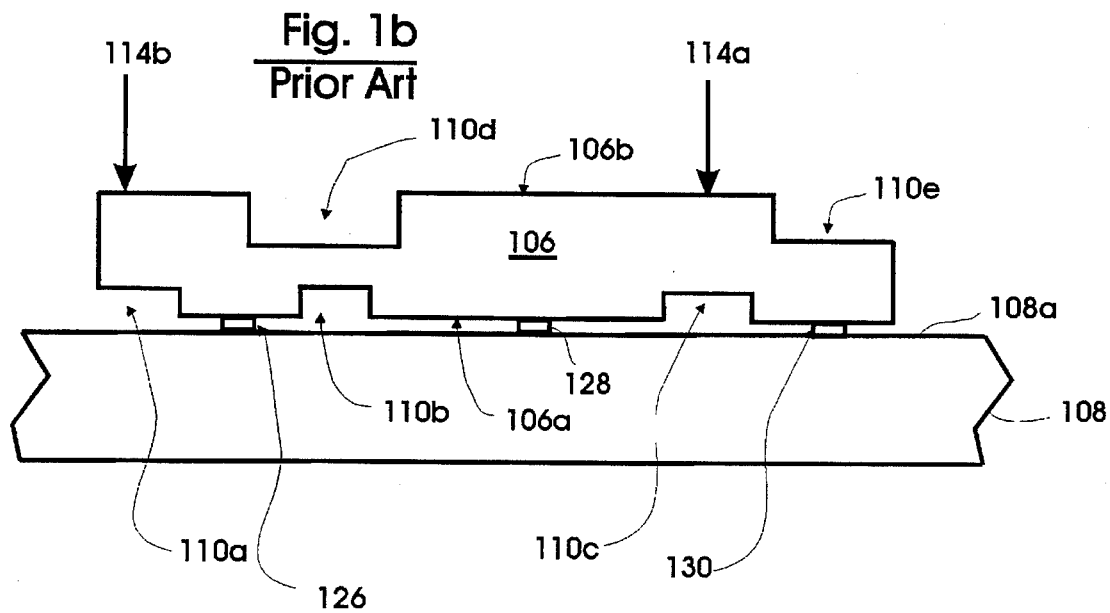
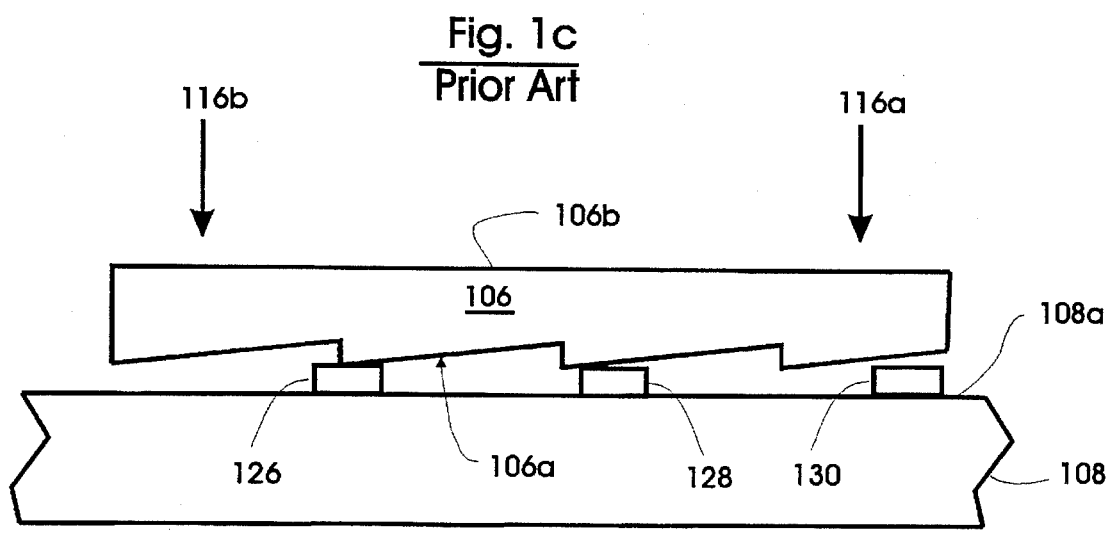

MACHINING OPPOSITE SURFACES OF A WORKPIECE TO BE PARALLEL TO ONE ANOTHER

TECHNICAL FIELD OF THE INVENTION

The invention relates to machining a workpiece and, more particularly, to machining two opposite surfaces of a workpiece so that the two opposite surfaces are flat and parallel to one another.

BACKGROUND OF THE INVENTION

For purposes of this discussion, machining a workpiece involves fixturing the workpiece in relationship to a machine tool. This is typically achieved by clamping a workpiece to a fixture which is in turn, mounted to the work table of a machine.

Machining techniques are available in several forms, depending on the workpiece design, material, specification, and application. Generally, as used herein, a machine will have a table for supporting a workpiece (or a fixture-supported workpiece), and a spindle for rotating a cutting tool that removes material from the workpiece. In the main, hereinafter, the use of a face mill cutting tool for machining a surface to be flat is discussed.

Depending on the workpiece application and specification, it may be required to machine (rough or finish) a surface (of a workpiece) and obtain flatness within a certain tolerance. Also, it may be specified that two opposite surfaces (e.g., top and bottom) are parallel to one another. As used herein, the concept of parallel, as applied to two faces of a workpiece, means that the plane established by a one of the two opposite faces is spaced apart from the plane established by an other of the two opposite faces by a uniform distance.

For example, an automatic transmission valve body may require that two opposite surfaces be machined so as to be flat (planar) and parallel to one another. The traditional manner of achieving this objective is to clamp the workpiece in a fixture, machine the one surface, then turn the workpiece over and re-clamp it—using the previously machined flat surface as a reference for machining the second (opposite) surface to be parallel. Typically, in order to machine (e.g., face mill) a workpiece, three button-like cast locators are disposed on the fixture base to support the opposite surface of the workpiece. Said opposite surface may be a previously-machined surface. The three cast locators act as "pedestals" or "legs" to establish a plane for machining the surface of the workpiece. Using such cast locators (disposed between the fixture base and the workpiece) can provide various sources of error in machining the second surface. For example:

a. chips or dirt between the workpiece and the fixture base (i.e., the cast locator buttons) to which the workpiece is mounted can result in the workpiece tipping—the result of which is that the second surface, when machined, will not be parallel to the first surface;

b. clamping (e.g., automatic clamping) the workpiece to the fixture base may distort the workpiece (depending upon its shape and material, or stiffness). This is especially noticeable when clamping down on the workpiece at a location that is not directly over the cast locators, which will tend to bend (distort) the workpiece. Such distortion of the workpiece will result in inaccurate machining—the result of which is that when the workpiece is un-clamped, the second surface will not be flat and will not be parallel to the first surface; and c. any surface irregularities (e.g., waviness, shingling, etc.) in the already-machined (albeit flat) first surface may cause an error in the machining of the second surface. This is primarily due to the fact that the clamping location tends to be fixed, while the location of "hills" and "valleys" on the previously-machined surface tend to be indeterminate in their location. Such surface irregularities, and clamping thereto (onto cast locators), may cause an unacceptable mislocation of the workpiece when performing the machining operation.

In the main hereinafter, the workpiece to be machined may be a casting of an automatic transmission valve body (aluminum material, thin, lightweight, and fragile). The valve body has a number of conduits (channels) extending into both the top and bottom surfaces thereof, for conveying automatic transmission fluid. The drive ratio of the automatic transmission is selected by the routing of these fluids through the various conduits disposed in the valve body.

Such a casting is typically irregularly shaped, has a top surface, a bottom surface opposite the top surface, and an edge surface extending around the periphery of the valve body. The thickness (as measured from the top surface to the bottom surface) of the casting varies (by way of example) from a maximum of $1\frac{1}{8}$ inch to a minimum of $\frac{11}{16}$ inch, which for purposes of this discussion is considered to be a thin workpiece.

Because the workpiece is made of aluminum, irregularly shaped, thin and therefore fragile, it is very difficult to accurately mill the workpiece flat to a tight specification, for example to within one thousandth of an inch (0.001"), and to hold parallelism between the two opposite surfaces to within one thousandth of an inch. The workpiece tends to deflect during milling, introducing anomalies into the surfaces.

When machining thin aluminum parts that require opposite parallel surfaces to mate with other parts (e.g., fluid control modules), it is common to first use cast locators (e.g., "legs", as described above) for rough or finish machining of the first machined surface (e.g., the top surface), and then to locate from three points (again, via cast locators disposed between the fixture base and the workpiece) on the previously-machined surface to surface machine the second, opposite surface (e.g., the bottom surface).

On some workpieces, notably automatic transmission control valve bodies, both opposite surfaces must be machined over their entirety. This makes it impossible to clamp directly over a vertical cast locator between the fixture base and the first machined face. When clamps exert a mechanical force through the workpiece anywhere other than directly over a cast locator, they will tend to distort the workpiece. Even though the distortion may be less than 0.002", such a distortion could be sufficient to cause the part to be out of tolerance in either flatness or parallelism.

U.S. Pat. No. 4,964,766, incorporated by reference herein, is representative of a fixturing apparatus for locating, orienting and holding a workpiece during a milling operation, having a workpiece-specific mounting provided with means for accurately and reproducibly positioning the workpiece within the fixture. The workpiece specific mounting has a workpiece specific pattern of clamping, vibration dampening and supporting devices to hold the workpiece during the milling operation. This patent addresses holding the workpiece for minimizing distortion and permitting for accurate, reproducible location and orientation of successive workpieces of the same geometry on the apparatus for the same milling operations that is achieved quickly and positively and vibration and workpiece distortion are minimized during the milling operations. However, the patent does not specifically address the techniques of the present invention.

SUMMARY OF THE INVENTION

It is therefore an object of the present invention to provide an improved technique for machining a workpiece.

It is a further object of the present invention to provide an improved technique for fixturing a workpiece, for machining.

It is a further object of the present invention to provide an improved technique for machining two parallel surfaces on a workpiece.

It is another object of the present invention to provide a technique of machining two opposite surfaces of a workpiece without referencing off of a one (e.g., the first to be machined) of the surfaces.

It is another object of the present invention to provide an improved technique for supporting a workpiece during the machining of two opposite surfaces of the workpiece.

According to the invention, a workpiece (part to be machined) is supported by its edge surface(s) during a first machining operation (e.g., milling) performed on a first (e.g., top) surface of the workpiece, and is supported by the edge surface(s) during a second machining operation (e.g., milling) performed on a second, opposite (e.g., bottom) surface of the workpiece. The edge of the workpiece is disposed around the periphery of the workpiece between the top and bottom surfaces thereof, which are intended to be machined flat and parallel to one another.

According to an aspect of the invention, the workpiece is supported during the two machine operations by at least three "edge features" disposed on the edge surface of the workpiece. Preferably, only three features are employed for support of the workpiece. The three edge features define (establish) a single, unique (reference) plane, passing through the workpiece, for referencing the machining of a one of the opposite surfaces, and the subsequent machining of an other of the opposite surfaces. This allows for precise locating of the workpiece being machined. By using the same three edge features for both machining operations, parallelism of the two opposite machined surfaces is assured.

According to an aspect of the invention, each of the three edge features on the workpiece are tapered, such as frustro-conical, indentations into the edge of the workpiece.

According to a feature of the invention, the edge features are depressions cast into the edge(s) of the workpiece. If such features are not present in the casting, it is within the scope of this invention that three suitable (i.e, for mating with the fixture points) edge features are formed (e.g., machined into) on the peripheral edge of the rough workpiece.

According to a feature of the invention, a first fixture has a planar base and is mounted to the work table of a machine. A first set of three fixture points is disposed on the fixture base. The first set of three fixture points engage the three edge features of the workpiece to support the workpiece above a surface of the fixture base, so that a one of the two opposite faces of the workpiece opposes (is presented for machining to) a cutting tool in a machine.

An important aspect of the invention is that the workpiece is supported above the fixture base, without touching the fixture base. This avoids any scratching or coining of the top and bottom surfaces of the workpiece, and is especially pertinent to avoiding scratching or coining the previously-machined surface of the workpiece. For example, a scratch of only 0.001" depth in a machined flat surface of an automatic transmission valve body could cause leakage of automatic transmission fluid, as well as non-optimal shifting.

According to a feature of the invention, a second fixture has a planar base and is mounted to the work table of a machine. A second set of three fixture points is disposed on the fixture base. The second set of three fixture points engage the (same) three edge features of the workpiece to support the workpiece above a surface of the fixture base, so that an other of the two opposite faces of the workpiece opposes a cutting tool in a machine. The second fixture base with its second set of fixture points is, in essence, a mirror image of the first fixture base with its first set of fixture points, so as to accommodate the flipped-over workpiece.

An important aspect of the present invention is that one of the three fixture points in a given set of three fixture points is formed not only to accurately locate the workpiece, in each of the x, y, and z axes, but may also be disposed at a location on the fixture to perform a primary role in reacting (resisting) the relatively extreme forces encountered during high speed machining. The remaining two of the three fixture points in the set of fixture points are formed primarily to accurately locate the workpiece in the z-axis. One or more of these remaining two of the three fixture points may also locate the workpiece in the x and y axes, and may also serve to react the machining forces.

Another important aspect of the present invention is that the two sets of three fixture points are identical to one another, from the one fixture (for machining the first surface of the workpiece) to the other fixture (for machining the other surface of the workpiece). This ensures that the second of the two sets of fixture points will interface the part in exactly the same manner as the first of the two sets of fixture points—replicating stresses imposed by fixturing on the workpiece as well as ensuring accurate locating of the workpiece from fixture-to-fixture.

It is within the scope of the present invention that the two sets of three fixture points are disposed on the same fixture base, in a "combination" fixture. Either using two fixture bases, each having a corresponding one set of fixture points, or using a combination fixture having the two sets of fixture points appear to be of equal efficacy—neither approach is particularly preferred.

Although two distinct fixture bases can be employed for the machining of the two opposite surfaces of a workpiece, the two fixture bases can support the workpiece for machining in the same machine, in a machining "system". However, it is within the scope of this invention that each of the two fixture bases is associated with (mounted in) a distinct one of two machines.

According to a feature of the invention, the machine operation performed on the workpiece is face milling.

According to a feature of the invention, the workpiece is an automatic transmission valve body, or similar component (such as a channel plate, pump body, etc.) having channels extending from at least one of its two (to be machined parallel to one another) opposite surfaces into the body of the workpiece. An automatic transmission valve body typically has channels in both of its to-be-machined-parallel faces. The invention is applicable to machining parts having channels in only one face.

According to a feature of the invention, the fixture points are cast locating point devices, such as known devices (mechanisms). However, particular geometries for the cast locator fixture points are discussed hereinbelow.

According to an aspect of the invention, a particular one of the three fixture points in both sets of three fixture points is formed as a sphere, having a rounded "nose" so as to engage a corresponding one of the edge features sufficiently to ensure accurate x, y, and z locating of the workpiece. In the case of a frustro-conical (tapered) edge feature, the interface between the particular one of the fixture points (of both sets of fixture points) and the particular edge feature will be a circle.

According to an aspect of the invention, one or both of the other two of the three fixture points are formed with a rounded, wedge-shape nose, so as to engage the corresponding remaining two edge features in two arc segments (each), to ensure accurate z-axis positioning of the workpiece for machining, and allow a degree of freedom for movement of the workpiece in the x and y axes.

The invention provides a more robust process for machining two opposite faces of a workpiece to be parallel to one another, due to the decreased probability of chips (including dirt, or any foreign object) influencing the location (orientation) of the workpiece, especially during machining of the second face. Moreover, by avoiding using a previously-machined face of a workpiece for referencing a subsequent machine operation, damage to the previously-machined face of the workpiece is entirely avoided (e.g., during fixturing the workpiece for the second machine operation). Additionally, by supporting the workpiece above the surface of the fixture base, the clearance (gap) between the workpiece and the fixture base may be advantageous for automated processes, vis-a-vis the transfer and loading of workpieces in a machine.

By using the same three edge features on the workpiece for machining both opposite surfaces of the workpiece, the location and clamping of the workpiece is duplicated, from machine operation (machining the first face of the workpiece) to machine operation (machining the second, opposite face of the workpiece).

By employing the same edge-supporting technique as well as the same edge features on the workpiece for supporting the workpiece, for machining both of the opposite surfaces thereof, any stresses imposed on the workpiece will be duplicated from machine operation (machining the first face of the workpiece) to machine operation (machining the second, opposite face of the workpiece).

The technique of the present invention requires fewer elements in the fixture(s) than the techniques of the prior art.

Other objects, features and advantages of the present invention will become apparent in light of the description that follows.

BRIEF DESCRIPTION OF THE DRAWINGS

FIG. 1 is a side cross-sectional view of a workpiece supported on a fixture base, said fixture base to be mounted to a work table of a machine, for machining a one surface of the workpiece.

FIG. 1b is a side cross-sectional view of the workpiece of FIG. 1 supported on a fixture base, in preparation for having a second, opposite surface machined, and illustrating a problem associated with clamping forces distorting the workpiece.

FIG. 1c is a cross-sectional view of the workpiece of FIG. 1 supported on a fixture base, in preparation for having a second, opposite surface machined, and illustrating a problem associated with surface irregularities (e.g., waviness, shingling, etc.).

DETAILED DESCRIPTION OF THE INVENTION

Figure 1A:
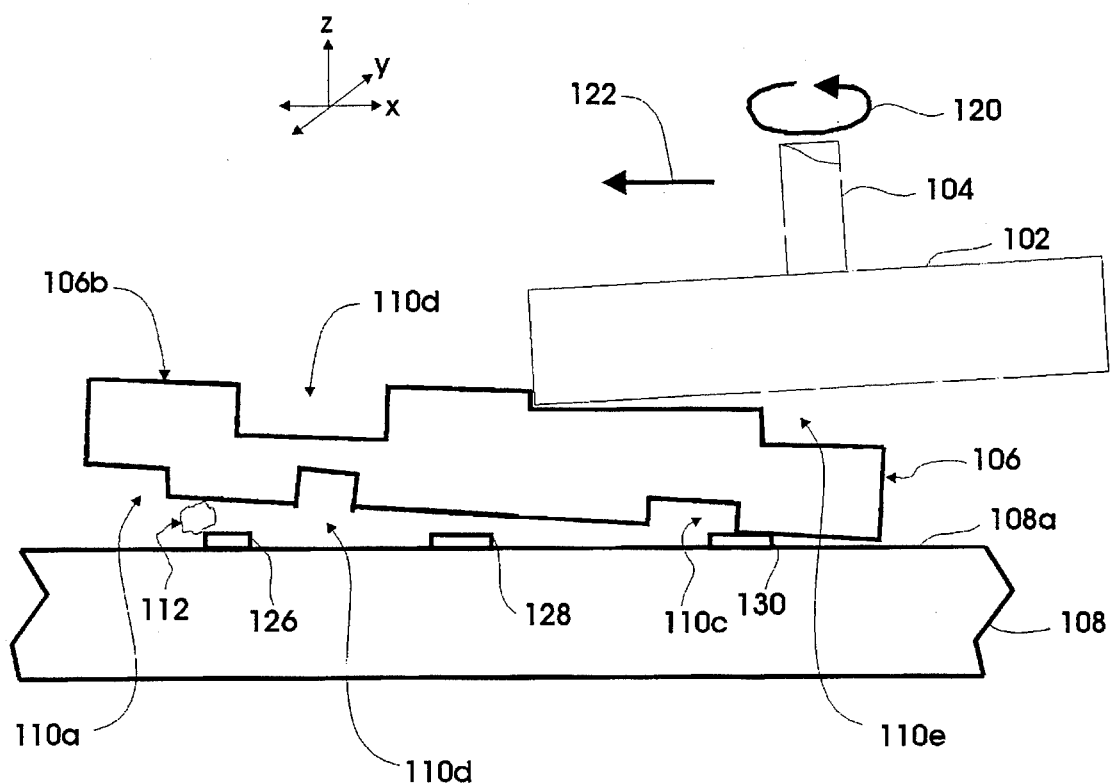
FIG. 1a is a side cross-sectional view of the workpiece of FIG. 1 supported on a fixture base, in preparation for having a second, opposite surface machined, and illustrating a problem with having a chip (foreign object) interposed between the workpiece and the fixture base.

FIGS. 1, 1a, 1b and 1c are illustrative of the problems associated with machining two opposite surfaces so that they are parallel to one another.

FIG. 1 shows a "generic" cutting tool 102, such as an face mill, rotationally (see arrow 120) driven by a shaft 104 and being linearly advanced (from right-to-left, as viewed; see arrow 122) along a surface 106a of a workpiece 106. The workpiece is clamped (clamps not shown) to a fixture base 108 which, in turn, is mounted to a work table of a machine. The face mill may be on the order of twenty inches in diameter, for machining a workpiece having a length on the order of twelve inches and a width on the order of twelve inches. Throughout the description that follows, it is assumed that the face mill has a larger diameter than the breadth of the workpiece (transverse to the relative linear motion of the cutting tool), in order that a face-milling operation can be performed in one pass. X, Y and Z axes are shown in the figure. In order to impart relative (linear) motion between the cutting tool 102 and the workpiece, the work table itself may be moved, rather than advancing the tool across the surface of the workpiece.

As illustrated, the cutting tool 102 has already machined a region (immediately under the cutting tool, and to the right of the cutting tool, as viewed in the figure) of the top surface 106a of the workpiece, and another region (to the left of the cutting tool, as viewed in the figure) of the top surface of the workpiece is yet to be machined. Evidently, the right-hand region is lower (having had material removed therefrom) than the left-hand region (which will have material removed therefrom). Upon completion of this illustrative machining operation, it is intended that the entire top surface 106a of the workpiece will flat (planar).

The spindle 104 is nearly normal to the top surface 108a of the fixture base 108, but it is preferably "towed" so that the leading (front) edge of the cutting tool (to the left of the cutting tool, as viewed in the figure) performs cutting, without the trailing edge of the cutting tool (to the right of the cutting tool, as viewed in the figure) contacting the already-machined surface of the workpiece.

As shown in FIG. 1, three button-like cast locators 126, 128 and 130 are disposed between the bottom face 106b of the workpiece 106 and the top surface 108a of the fixture base. A typical button-like cast locator (126, 128, 130) would be up to one inch in diameter. The button-like cast locators are essentially shims, and are used to establish the orientation of the top surface 106a for machining.

Alternatively, it is known to use edge locating pins, such as are disclosed in the U.S. Pat. No. 4,964,766 (e.g., element 22) to locate the workpiece for a machining a first surface of the workpiece. In such a case, however, the first (previously-machined) surface is used to reference the machining of the second surface, and problems associated with such a technique are illustrated in FIGS. 1a, 1b and 1c.

As illustrated in FIG. 1, the workpiece 106 may have channels 110a, 110b, 110c, 110d and 110e extending into both its top 106a and bottom 106b surfaces. These channels may communicate with one another (e.g., the channel 110b may be in fluid communication with the channel 110d).

Having completed the machining of the top surface 106a, it is known to flip the workpiece over, so that the top surface 106a of the workpiece is against the top surface 108a of the fixture base, to machine the bottom surface 106b of the workpiece. The problems associated with attaining parallelism between the top and bottom surfaces of the workpiece, as mentioned hereinabove, are illustrated in FIGS. 1a, 1b and 1c.

As shown in FIG. 1a, the previously-machined surface (106a) is used to locate the workpiece for subsequent machining of the opposite surface (106b). As shown, a foreign object 112, such as a chip or other detritus from the previous machining operation performed on the top face 106a, may become lodged between the top (previously-machined) surface (face) 106a of the workpiece and a button-like cast locator 126 disposed on the top surface 108a of the fixture base. As shown in the figure, this will result in a mis-orientation of the workpiece. In a subsequent machining operation performed on the bottom surface (face) 106b of the workpiece, one can be certain that the bottom face 106b, although machined to be flat, will not be parallel to the to face 106a. In both of FIGS. 1 and 1a, clamps for holding the workpiece to the work table (or fixture base) have been omitted, for illustrative clarity.

As shown in FIG. 1b, the use of clamps exerting a downward force on the workpiece to hold it against the fixture base can cause an unacceptable distortion of the workpiece when machining the second face 106b. Herein the downward forces imposed on the workpiece by two clamps are illustrated by two downward-directed arrows 114b and 114c. Although not evident from this cross-sectional view, the clamps would necessarily be disposed so as not to interfere with the machining of the second face 106b. Of note, however, a first one of the clamps (not shown) exerts its clamping force 114a through the body of the workpiece 106 at a position offset (in the x-y plane) from the button-like cast locator 126. Similarly, a second one of the clamps (not shown) exerts its clamping force 114b through the body of the workpiece 106 at a position offset (in the x-y plane) from the button-like cast locator 130. These locations for the clamps may be unavoidable, since the location of the clamps may be necessitated and/or constrained by various ancillary factors. In any event, it is evident that a clamping force (114a, 114b) directed through the body of the workpiece, offset from a button-like cast locator, will tend to distort the workpiece, irrespective of the stiffness of the workpiece. Such a distortion of the workpiece, when machining the second face (106b) will result in the second face not being flat upon completion of machining (after machining the second face and un-clamping the workpiece), and will tend to diminish the sought after flatness and parallelism between the first machined face (106a) and the second machined face (106b). Flatness being a sought after (highly desirable) characteristic, when attempting to machine any one or more faces of a workpiece (such as a transmission valve body), in the case of two faces to be parallel to one another, any distortion or inaccurate location of the workpiece during the machining operation is unacceptable.

One might be tempted to propose the use of a "vacuum chucking" arrangement, whereby the work table (or fixture base) would be provided with a number of holes communicating with a vacuum pump for holding the workpiece down on the table. This would appear to address the undesirable characteristics (e.g., bending moments) of mechanical clamping, in theory, but the reality is that the clamping force exerted by such an arrangement may be insufficient to hold the workpiece in place during aggressive (e.g., high depth of cut) machining. Moreover, if the workpiece has holes through it (such as is likely in the case of the channels in the top surface of a valve body being in communication with the channels in the bottom surface of the valve body), a vacuum chucking arrangement will simply not work.

The surface (face) of a workpiece, although "flat" (by definition) may exhibit certain surface irregularities including, inter alia, waviness and shingling. Such surface irregularities can also (i.e., in addition to the problems discussed hereinabove) introduce variables into the parallel machining of two opposite surfaces of a workpiece.

FIG. 1c illustrates a problem (in the parallel machining of two opposite surfaces of a workpiece) introduced by shingling of the first surface of the workpiece. In this view, the channels (110a . . . 110e) are omitted for illustrative clarity. As shown, the previously-machined first (top) surface 106a of the workpiece is flat, but irregular, exhibiting peaks and valleys. This may occur, for example, if one of a plurality of teeth in a cutting tool is not properly set in the tool. The irregularity of the top surface (106a) is greatly exaggerated, for illustrative clarity. As shown, the button-like cast locator 126 sits on a peak, and the button-like cast locator 130 sits in a valley on the previously-machined surface (106a) of the workpiece. Generally, clamping forces 116a and 116b (compare 114a, 114b) acting through the thickness of the workpiece will be indeterminately located vis-a-vis the peaks and valleys of the previously-machined surface 106a. This may introduce distortions and mislocations in the workpiece in a manner similar to the to that which was discussed with respect to FIG. 1b. The problem is that a mislocation may result from the clamping devices contracting the workpiece on an anomaly, locating on either a peak or a valley (i.e., on either a high spot or a low spot).

In summary, there have been described hereinabove a number of problems typically (e.g., inherently) associated with using the first machined surface (e.g., 106a) of a workpiece as a reference for machining the second, opposite surface (e.g., 106b) of the workpiece to be parallel to the first surface, and with using button-like cast locators to support the previously-machined surface of the workpiece for subsequent machining of an opposite surface of the workpiece. As will be evident, the present invention overcomes these problems, by completely avoiding referencing off of the first machined surface, and using button-like cast locators between the workpiece and the fixture base.

As is generally well known, any three distinct points (in three dimensional space) define a plane. One does not. Two do not. Four (or more) do not (unless they happen to be co-planar points). The present invention takes advantage of (e.g., "leverages") this Euclidian concept.

According to the invention, a workpiece is held in a first fixture by a first set of three fixture points engaging three edge features on the workpiece, for machining a one surface of the workpiece. To machine an other, opposite surface of the workpiece, the workpiece is re-fixtured, in the same or another fixture, using a second set of three fixture points identical to the first set of three fixture points, and engaging the same three edge features on the workpiece. In both instances, the workpiece is held above a fixture base so that its surfaces, especially a previously-machined surface, does not contact the fixture base. Since it is not necessary to "touch" either of the machined surfaces of the workpiece, any possibility of marking or scratching the surface (coining, dinging, etc.) is substantially circumvented.

Figure 2A:
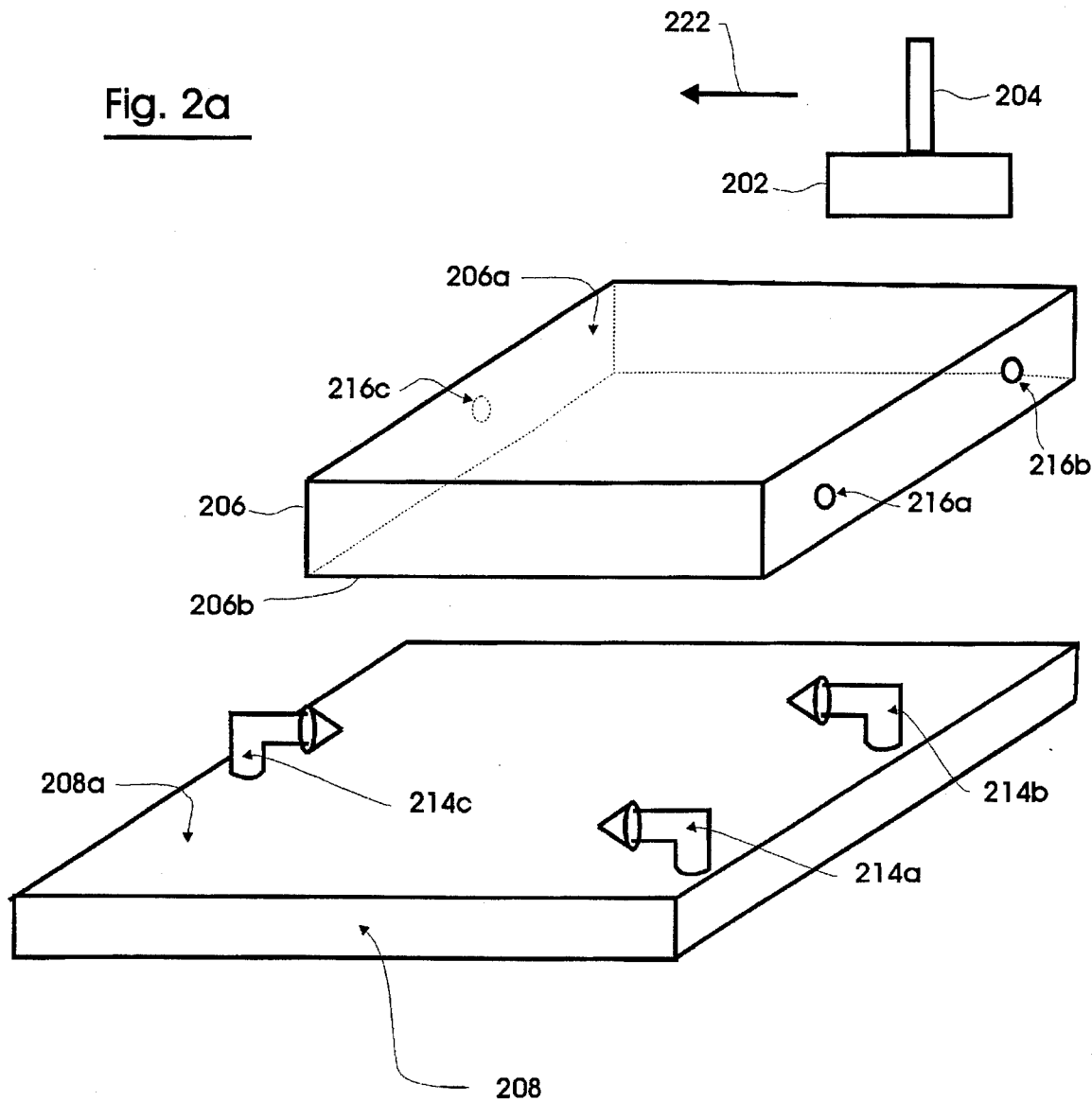
FIG. 2a is an exploded, perspective view of a workpiece supported by a fixture for machining a first surface of the workpiece, according to the present invention.

FIG. 2a shows a fixture base 208 (compare 108) having a top surface 208a, and a cutting tool 202 (compare 102) rotated by a spindle 204 (compare 104) and disposed for relative motion across the surface of a workpiece. For purposes of illustrative clarity, the cutting tool 202 (e.g., face mill) is shown much smaller than it would preferably be (compare FIG. 1).

The top surface 208a of the fixture base 208 is provided with a first set of at least three (preferably exactly three) mechanical fixture points 214a, 214b and 214c (shown schematically), which are spaced apart from one another. These three "points" (214a, 214b and 214c), shown as cones, define a plane above the top surface 208a of the fixture base.

The three fixture points 214a, 214b and 214c are spaced apart from one another so that at least two of the points will bear upon two opposite edge portions of a workpiece, the third point being designed and located to cooperate with the other two points to firmly secure the workpiece atop the fixture base, without distortion or movement. In other words, the three points should not be nearly collinear—they should be more triangularly (e.g., equilaterally) spaced from one another, to form a stable "platform" for machining of the workpiece.

In the exploded view of FIG. 2a, a "generic" workpiece 206 (compare 106) is shown as having three edge features 216a, 216b and 216c disposed along its peripheral edge(s) which will align, on a one-for-one basis, with the three "generic" fixture points 214a, 214b and 214c. (The fixture point 214a mates with the edge feature 216a, the fixture point 214b mates with the edge feature 216b, and the fixture point 214c mates with the edge feature 216c.) It is anticipated that the workpiece may have cutouts (channels) extending from its top and/or bottom surfaces into the body of the workpiece, such as channels (compare 110a ... 110e), which are omitted from this figure for illustrative clarity.

The edge features 216a, 216b, 216c are suitably depressions (indentations) extending from the edge(s) of the workpiece into the body thereof. These depressions, or concavities, are suitably cast into the workpiece, but may be machined into the workpiece. The edge features are generally tapered, and may be frustro-conical, wedge-shaped, ramped or the like.

In a first machining operation, the workpiece 206 is mounted to the fixture base 208 by inserting the three fixture points (214a, 214b, 214c) into the three corresponding edge features (216a, 216b, 216c). The fixture points are elevated (in the z-axis) above the top surface 208a of the fixture base a sufficient distance to ensure that the workpiece 206 is entirely suspended by the fixture points above the top surface 208a of the fixture base, and does not touch the fixture base. After mounting the workpiece to the fixture base, the machining operation on the first (top) face 206a of the workpiece is performed. This will result in the top surface 206a of the workpiece being flat.

It is now desired to machine the second, opposite face 206b of the workpiece to be flat, and parallel to the first (previously-machined) surface 206a of the workpiece.

Generally, in order to machine the second, opposite surface 206b of the workpiece so that it is parallel (as in parallel planes) to the first surface 206a of the workpiece, the workpiece is flipped over, and the same exact edge features (216a, 216b nd 216c) as were used to establish the location of the workpiece during the machining of the first face 206a are employed to establish the location of the workpiece during the machining of the second, opposite face 206b of the workpiece. By using the same edge features, which are determinate (fixed in location) with respect to the workpiece, a high degree of parallelism between the first (206a) and second (206b) faces of the workpiece can be achieved. This is due, primarily, to the fact that the three spaced-apart, non-collinear edge features (216a, 216b, 216c) on the workpiece establish a single, unique, "reference" plane (passing through the workpiece) for machining both of the faces (206a, 206b) of the workpiece. The plane defined by the three edge features (216a, 216b, 216c) is between the two faces (206a, 206b) of the workpiece.

It would merely be fortuitous, and it is certainly not necessary, that the "reference" plane established by the three edge features would be parallel to the ultimately machined opposite surfaces of the workpiece. It is contemplated that the reference plane will be skewed (not parallel) with respect to the ultimately machined surfaces (see, e.g., the reference plane 270 in FIG. 2d). This, however, is not a problem since no matter what the orientation of the reference plane (270), the vertical orientation of the workpiece can be set by establishing the height of the fixture points above the workpiece base. The important feature is that the reference plane establishes a fixed, single, unique frame of reference for the machining of the two opposite surfaces, and that the two sets of fixture points are identical to one another.

If there were perfect symmetry in the location of the workpiece features (216a, 216b, 216c), the workpiece could simply be flipped over and re-mounted to the same three fixture points (214a, 214b, 214c), and while such a fortuitous situation is contemplated to be within the scope of the present invention, the present invention is more generally directed to the more likely case where such symmetry does not exist.

Figure 2B:
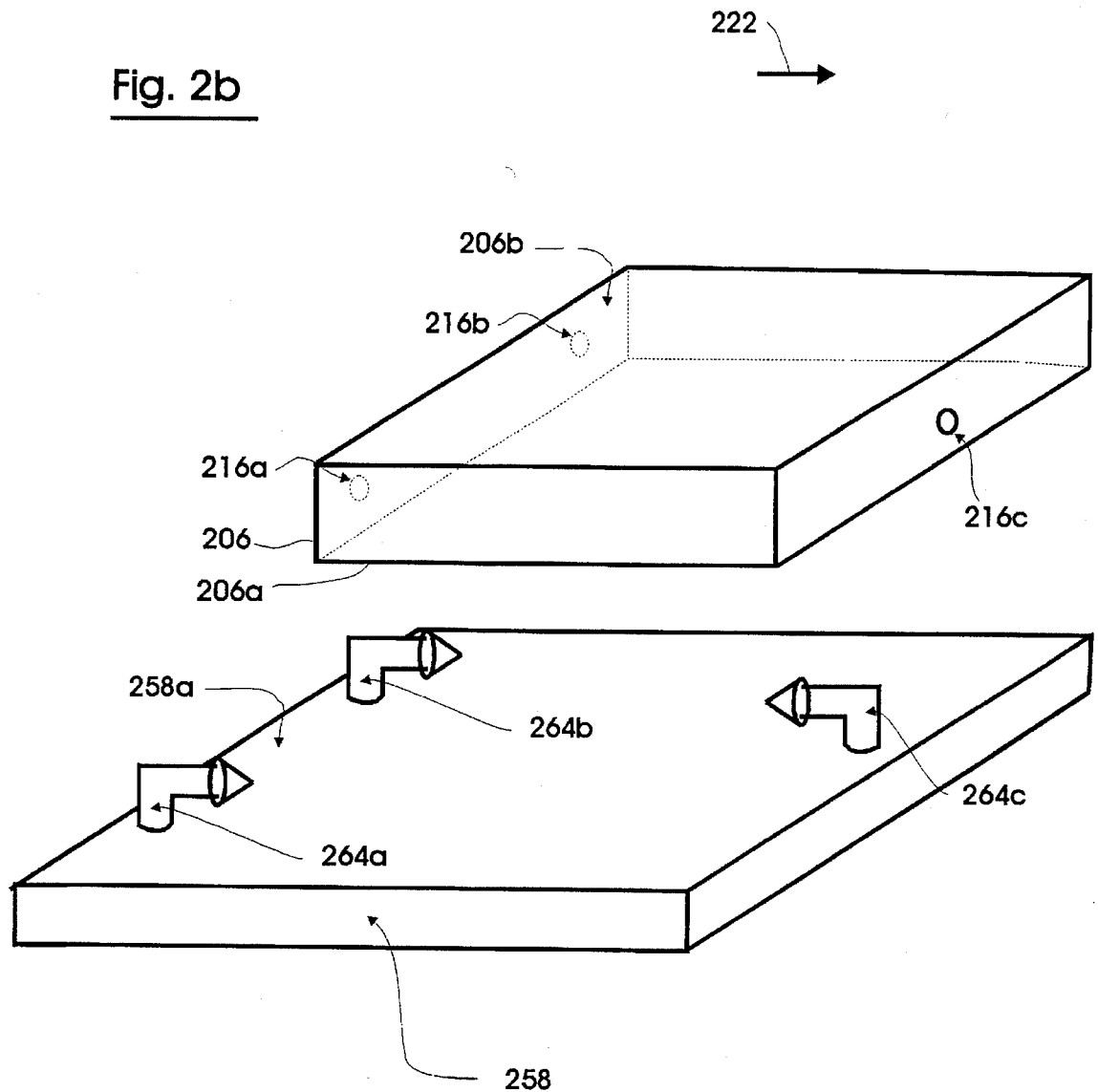
FIG. 2b is an exploded, perspective view of the workpiece of FIG. 2a, supported by a fixture for machining a second surface of the workpiece, said second surface being opposite said first surface, according to the present invention.

FIG. 2b shows another fixture base 258 (compare 208) having a second set of at least three (preferably exactly three) fixture points 264a, 264b and 264c (compare 214a, 214b, 214c) for holding the same workpiece 206 (which has already had its first, top surface 206a machined) in position to have its bottom (opposite, second) surface 206b machined in a subsequent operation, using the same or an other cutting tool by the same or by another machine. The fixture point 264a mates with the edge feature 216a, the fixture point 264b mates with the edge feature 216b, and the fixture point 264c mates with the edge feature 216c. An important feature of the invention is that the second set of fixture points 264a, 264b and 264c are identical to the first set of fixture points 214a, 214b and 214c. In other words, the fixture point 264a is identical to the fixture point 214a, the fixture point 264b is identical to the fixture point 214b, and the fixture point 264c is identical to the fixture point 214c.

In this figure, the cutting tool (face mill) is omitted, for illustrative clarity, but the tangential force imposed on the workpiece during machining is represented by the arrow 222. It is within the scope of this invention that the second set of fixture points 264a, 264b, 264c are disposed on the same "compound" fixture base as the first set of fixture points 214a, 214b and 214c.

For machining the second, opposite face 206b of the workpiece 206, the fixture base 258 may be mounted to the work table of the same machine as was used to machine the first surface 206a of the workpiece, or it may be mounted to the work table of another machine.

Although not preferred, if two machines were used to perform the two machine operations, the machines may be similar to one another (e.g., both being milling machines), and the cutting tools may be similar to one another (e.g., both being face mills).

In FIGS. 2a and 2b, the two sets of fixture points are shown in a merely schematic manner, to illustrate the inventive technique of fixturing the edge(s) of the workpiece to accurately locate the workpiece for machining the two opposite faces thereof. The fixture points referred to herein (and shown schematically as cones) may suitably be pins disposed in "T"-shaped blocks, as disclosed in the aforementioned U.S. Pat. No. 4,964,766 (see, e.g., block element 22A and locating pin 22 therein). In such a case, each of said pins will be sized and shaped to engage the corresponding edge features of the workpiece, so as to accurately position the workpiece.

Figure 2C:
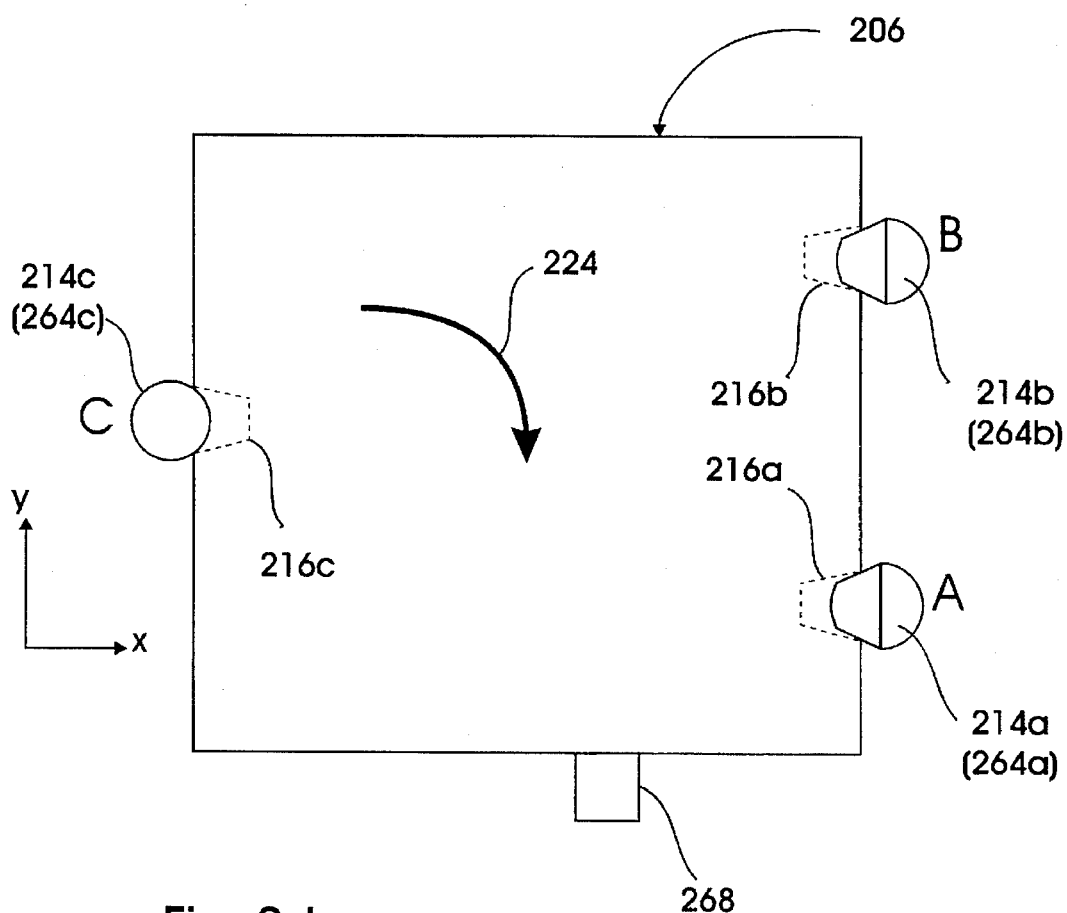
FIG. 2c is a top plan view, partially in cross-section, of a workpiece supported by a set of three fixture points, according to the present invention.
Figure 2D:
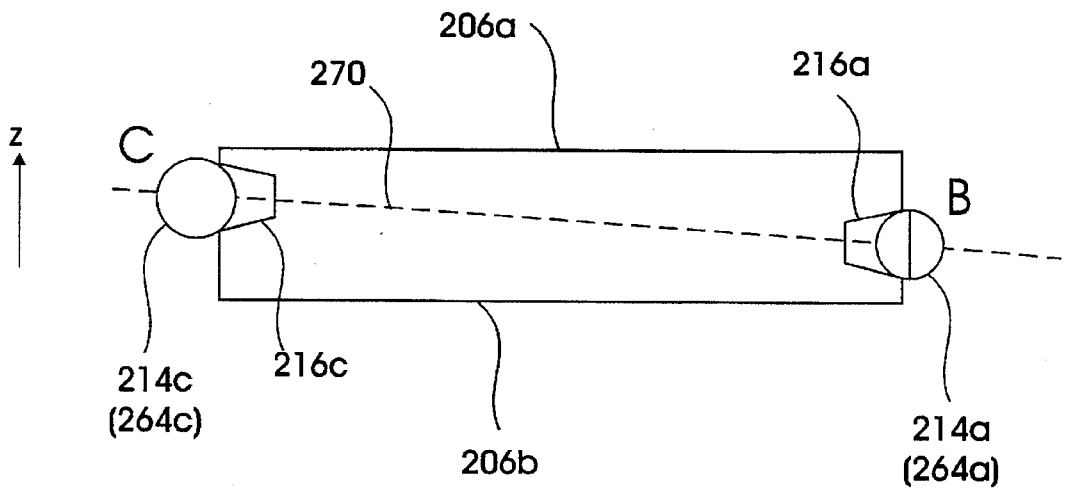
FIG. 2d is a side view, partially in cross-section, of the workpiece of FIG. 2c supported by the set of three fixture points, according to the present invention.

FIGS. 2c and 2d illustrate in greater detail a preferred embodiment of the two sets of fixture points—the first set 214a, 214b and 214c, and the second set 264a, 264b and 264c. The description is mainly in terms of the first machining operation on the top face 206a of the workpiece 206 (compare FIG. 2a), but is applicable to the second machining operation on the bottom face (206b) of the workpiece. As mentioned hereinbefore, the fixture points (shown in FIGS. 2a and 2b as arrow points), may be pins. For illustrative clarity, only the ends of the fixture points engaging the edge features on the workpiece are illustrated.

As mentioned hereinabove, the edge features are suitably frustro-conical (tapered) indentations extending from the edge surface(s) of the workpiece into the workpiece. A first one of the three edge features 216c has a diameter (taken at the edge surface) of D1. A second one of the three edge features 216a has a diameter (taken at the edge surface) of D2. A third one of the three edge features 216b has a diameter (taken at the edge surface) of D3.

A first ("C") fixture point 214c of the first fixture 208 is spherical, having a rounded "nose" for fully engaging the corresponding edge feature 216c. The interface of the first fixture point 214c and the workpiece will thus be a complete circle (of diameter D1) extending around the nose of the first fixture point. If machining occurs in the direction of this fixture point "C" (compare FIG. 2a), this will provide a relatively solid "buttress" resisting movement of the workpiece from a force (222) imposed by the cutting tool (not shown), during machining of the face 206a. However, in this embodiment of the invention, it is illustrated that the cutting tool is moved away from the fixture point "C", as illustrated by the arrow 224, so that the fixture points "A" and "B" will receive the greatest sum of cutting forces imposed on the workpiece by the cutting tool. The diameter of the first fixture point 214c is R1, which is greater than the diameter D1 of the first edge feature 216c.

The fixture point "C" may be mounted so as to be hydraulically or mechanically moveable in the x-direction, to engage the edge feature 216c and to secure the workpiece against the fixture points "A" and "B". The fixture point "C" may also be mounted so as to have a limited degree of freedom in the x-y plane. Importantly, the fixture point "C" is mounted to the fixture base so as to have a predetermined height (in the z-axis), thereby accurately locating the workpiece in the z-axis.

A second ("B") fixture point 214b of the first fixture 208 is partially spherical, having a diameter R2 greater than the diameter D2 of the second edge feature 216b. More particularly, the "sides" of the fixture point 214b may be tapered so that the nose of the second fixture point 214b is wedge-shaped. In this manner, the second fixture point 214b will engage the second edge feature 216b at only the top and bottom surfaces of the corresponding edge feature 216b, in two arc segments (partial circles, thereby accurately locating the workpiece in the z-axis.

It is contemplated that the fixture point "B" will be rigidly fixed to the fixture base, and that it is spherical for reacting forces. Alternatively, it may be mounted so as to be hydraulically or mechanically moveable in the x-direction. The fixture point "B" may also be mounted so as to have a limited degree of freedom in the x-y plane. Importantly, the fixture point "B" is mounted to the fixture base so as to have a predetermined height (in the z-axis), thereby accurately locating the workpiece in the z-axis.

A third ("A") fixture point 214a of the first fixture 208 may either be spherical (similar to the first fixture point "C"), having a diameter R3 greater than the diameter D3 of the second edge feature 216a, or it may be tapered in a manner similar to the second fixture point "B".

It is contemplated that the fixture point "A" will be rigidly fixed to the fixture base. Alternatively, it may be mounted so as to be hydraulically or mechanically moveable in the x-direction. The fixture point "A" may also be mounted so as to have a limited degree of freedom in the x-y plane. Importantly, the fixture point "A" is mounted to the fixture base so as to have a predetermined height (in the z-axis), thereby accurately locating the workpiece in the z-axis.

For automated machining of the workpiece, the workpiece would be "loaded" against the "fixed" (i.e., to the fixture base) fixture points 214a and 214b (in a subsequent machining operation, against the fixture points 264a and 264b), and the fixture point 214c (or 264c) would be moved into position (i.e., to engage the corresponding edge feature 216c and locate the workpiece in the x-y plane), such as by a hydraulic actuator (not shown).

As mentioned hereinabove, an important feature of the invention is that the second set of fixture points (264a, 264b, 264c) is identical to the first set of fixture points. In other words, there is a one-to-one correspondence between the fixture points of the one fixture (208) and the fixture points of the other fixture (258). In FIG. 2c this is reflected in the parenthetical "( )" element numbering of the fixture points. Importantly, the vertical (z-axis) height of the fixture points can be established to appropriately compensate for the location of the workpiece edge features in the vertical (z-axis) to achieve the correct vertical positioning of the workpiece, and it is not necessary or preferable that the reference plane be coplanar to the machined surfaces.

FIG. 2d illustrates the notion that the reference plane 270 (dashed line) established by the three workpiece edge features need not be parallel to the desired plane of the machined opposite surfaces 206a, 206b.

Establishing the vertical (z-axis) height of the fixture points above the surface of the fixture base has been described hereinabove. It is within the contemplated scope of this invention that the heights of the fixture points would be adjustable. However, for given workpieces having given edge features, once the appropriate vertical height of the fixture points is established, it should remain the same from workpiece-to-workpiece.

The geometry of the fixture points, which may be the pins of cast locating devices, can be different than described above. For example, the second and third fixture points (214a, 214b; 264a, 264b) could be "bullet shaped", having a rounded nose, and could make full circular contact (similar to the fixture points 214c and 264c) contact with the corresponding edge features. In the case of the fixture points 214a and 214b (as well as 264a and 264b) being round, and making full circular contact with the corresponding edge feature (e.g., 216a and 216b), respectively, a degree of x–y freedom can be incorporated into the cast locating device (e.g., into the "T" block).

It is also within the scope of this invention that additional clamp-type devices may be brought to bear upon the edge(s) of the workpiece to dampen vibrations during machining. These additional clamp-type devices would not locate or mislocate the workpiece, and inasmuch as they would not bear down upon the workpiece, they would not distort the workpiece. In FIG. 2c, one such additional clamp-type device 268 is illustrated as a block. A suitable number of such devices (268), acting as dampers, could be disposed strategically along the edge(s) of the workpiece to dampen chatter induced (by machining) vibrations. The devices (268) could be moved into position, against the edge(s) of the workpiece, automatically (e.g., by hydraulics).

As mentioned above, the ends of the fixture points engaging the workpiece edge features can be can be spherical, wedge-shaped, bullet-shaped, ramped, or any other geometry, including combinations of the above.

As mentioned above, the workpiece edge features may be frustro-conical, or any other suitable geometry, such as wedge-shaped.

Figure 3:
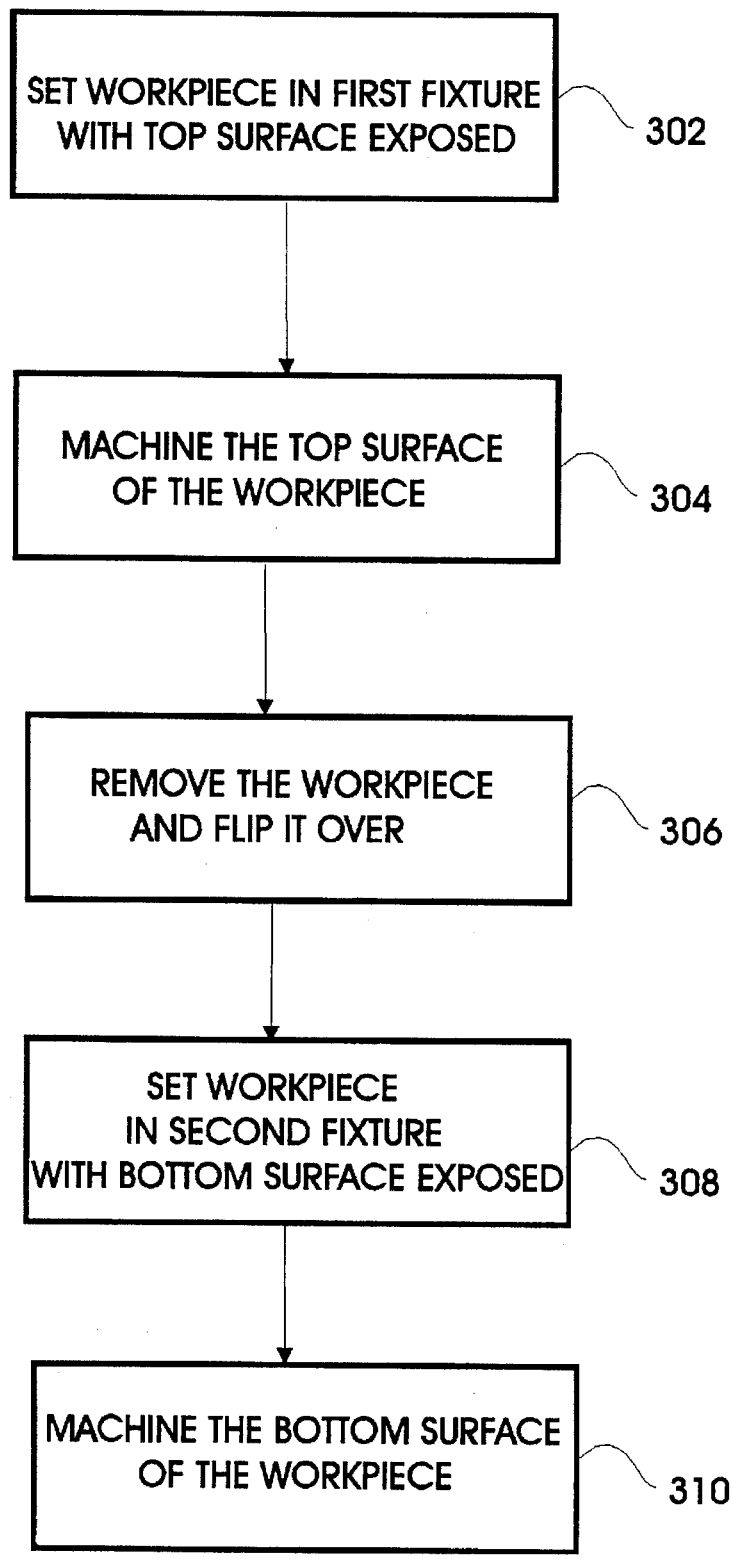
FIG. 3 is a process flow chart illustrating the steps of the present invention.

FIG. 3 illustrates the methodology of the present invention, in a sequence of process flow steps which may be performed by a human operator, by a programmed machine, or by a combination of both.

In a first step 302, the workpiece is set in a fixture so that one of its surfaces (e.g., 206a) is oriented away from the fixture base (e.g., 208) and is exposed for machining. The fixture, with the workpiece mounted thereto, is then placed in a machine for machining the first one of its surfaces.

In a next step 304, the first surface of the workpiece is machined, preferably so that the first surface is flat. As mentioned above, it is preferred but it is not necessary that the reference plane established by the three edge features be exactly parallel to the inchoate machined surface of the workpiece. One having ordinary skill in the art to which the invention most nearly pertains will understand, however, that pre-cast edge features may establish a plane that is tilted (skewed) from this desired orientation. In such a case, the elevation of the three fixture points (e.g., 214a, 214b, 214c) are set so that the axis of rotation of the cutting tool is approximately normal (but towed 0.001–0.003 inches, as described hereinabove with respect to FIG. 1) to the desired plane of the machined workpiece surface. (More aptly, the workpiece should be fixtured so that the plane in which the cutting tool travels across the surface of the workpiece is parallel to the desired plane of the machined surface of the workpiece.) The goal is to set the workpiece in the fixture so as to have a predetermined orientation vis-a-vis the machine, which is achieved by the workpiece having a predetermined orientation with respect to the fixture base.

In a step 306, having completed the first machining operation on the first surface (e.g., 206a) of the workpiece, the workpiece is disengaged from the fixture (e.g., 208).

Next, in a step 308, the workpiece is set in a second fixture so that an other of its surfaces (e.g., 206b) is oriented away from the fixture base (e.g., 208) and is exposed for machining. An important feature of this step is that the same three edge features (e.g., 216a, 216b and 216c) are used to locate the workpiece for the second machining operation (e.g., 310) as were employed for the first machining operation (e.g., 304). The fixture, with the workpiece mounted thereto, is then placed in a second machine for machining the other, opposite surface. Preferably, the three edge features are all conical holes extending into the edge(s) of the workpiece. The first and second fixtures can be combined.

Finally, in a step 310, the second, opposite surface of the workpiece is machined, preferably so that the second surface is flat. The workpiece, which is now a finished part, is then removed from the second fixture. As mentioned above, it is not the least bit important that the reference plane established by the three edge features be parallel to the ultimately machined surfaces, since the vertical orientation of the workpiece can be secured by adjusting the height of the fixture points above their respective fixture bases. The object is to be able to mount (set) the workpiece in the fixture so that the workpiece will have a predetermined orientation with respect to the fixture base, for accurate machining. For two machine operations on two opposite faces of a workpiece, this is achieved by setting the heights of the various fixture points in the two fixtures (or of the two sets of fixture points in one, compound fixture).

After having its two opposite surfaces machined in the manner set forth above, the workpiece (e.g., finished part) will have two, machined, opposite surfaces, which are flat and parallel to one another.

The above, and other objects, features, advantages and embodiments of the invention, including other (i.e., additional) embodiments of the techniques discussed above may become apparent to one having ordinary skill in the art to which this invention most nearly pertains, and such other and additional embodiments are deemed to be within the spirit and scope of the present invention.

For example, the two sets of fixture points, in other words the set 214a, 214b, 214c and the set 264a, 264b, 264c can be disposed on the same fixture base, rather than on two separate fixture bases. However, this may not be preferred, there being a distinct possibility of such a fixture not being able to accommodate two sets of fixture points. On the other hand, it may be very useful to have two fixture bases mounted side-by-side in one machine, automated machinery placing the workpiece in a one of the fixtures for machining a one of its faces, then moving the workpiece to an other of the fixtures for machining an other of its faces. Other configurations of fixture bases, vis-a-vis machines are within the scope of this invention and will readily be apparent to one having ordinary skill in the art to which this invention most nearly pertains.

The geometry, especially the nose shape of the fixture points has been described hereinabove (see, e.g., FIGS. 2c and 2d). It is within the scope of this invention that the fixture points could have another geometry, for example, one or more of the fixture points could have a conical nose shape. Again, it is important to the successful implementation of the techniques of the present invention that the second set of fixture points would be identical to the first set of fixture points, so that location of the workpiece and stresses imposed on the workpiece is replicated during the two machining operations.

The invention has been described in terms of machining two opposite surfaces of a workpiece to be flat and parallel to one another, and the techniques disclosed herein are exceptionally useful for achieving such a purpose. One having ordinary skill in the art to which the invention most nearly pertains will also recognize that the techniques of the present invention may also be useful for machining one surface of a workpiece to be flat, and an other, opposite surface of the workpiece to be contoured ("crowned"), while maintaining parallelism between the two opposite surfaces of the workpiece.

What is claimed is:

1. Method of machining two opposite faces of a workpiece to be parallel to one another, comprising:

establishing, with three edge features disposed around an edge of a workpiece, a plane passing through the workpiece, said plane located between a first surface of the workpiece and a second surface of the workpiece, said second surface being opposite said first surface;

mounting the workpiece by a first set of three fixture points physically engaging the three edge features;

performing a first machining operation on the first surface of the workpiece;

re-mounting the workpiece by a second set of three fixture points physically engaging the three edge features; and performing a second machining operation on the second surface of the workpiece.

2. Method, according to claim 1, wherein:

the first set of fixture points is identical to the second set of fixture points.

3. Method, according to claim 1, wherein:

all of the fixture points are disposed at established heights above a surface of a fixture base; and the heights of all of the fixture points are established to ensure that the second machined surface of the workpiece will be parallel to the first machined surface of the workpiece.

4. Method, according to claim 1, wherein:

the first machining operation is face milling; and the second machining operation is face milling.

5. Method, according to claim 1, wherein:

the workpiece is an automatic transmission valve body.

6. Method, according to claim 1, wherein:

the first set of three fixture points are disposed on a first fixture base; and the second set of three fixture points are disposed on a second fixture base separate from the first fixture base.

7. Method, according to claim 6, wherein:

in the second machining operation, the previously-machined first surface of the workpiece does not contact the second fixture base.

8. Method, according to claim 1, wherein:

the first set of three fixture points are disposed on a compound fixture base; and the second set of three fixture points are disposed on the compound fixture base.

9. A method of machining two opposite surfaces of a workpiece, comprising:

providing three edge features along one or more edges of a workpiece, said one or more edges disposed between a first face of the workpiece and a second face of the workpiece, said second face being opposite the first face;

mounting the workpiece in a first fixture having a first fixture base and a first set of three fixture points disposed on a surface of the first fixture base, said first set of three points being sufficiently elevated above the surface of the first fixture base to ensure that the workpiece does not contact the surface of the first fixture base;

performing a first machining operation on the first face of the workpiece;

dismounting the workpiece from the first fixture;

re-mounting the workpiece to in a second fixture having a second fixture base and a second set of three fixture points disposed on a surface of the second fixture base, said second set of three points being sufficiently elevated above the surface of the second fixture base to ensure that the workpiece does not contact the surface of the second fixture base; and performing a second machining operation on the second face of the workpiece.

10. Method, according to claim 9, wherein:

the first set of fixture points are identical to the second set of fixture points.

11. Method, according to claim 9, wherein:

all of the fixture points are disposed at established heights above a surface of the fixture base; and the heights of all of the fixture points are established to ensure that the second machined surface of the workpiece will be parallel to the first machined surface of the workpiece.

12. A fixturing system for supporting a workpiece for machining two opposite surfaces of the workpiece to be parallel to one another, said system comprising:

a first fixture having a first base and having a first set of at least three fixture points disposed on a surface of the first base, said first set of at least three fixture points being arranged on the first base to support a workpiece in a first predetermined orientation above the surface of the first base and to engage corresponding at least three edge features disposed around a peripheral edge of the workpiece; and a second fixture having a second base and having a second set of at least three fixture points disposed on a surface of the second base, said second set of at least three fixture points being arranged on the second base to support the workpiece in a second predetermined orientation above the surface of the second base and to engage the at least three edge features disposed around the peripheral edge of the workpiece;

said workpiece has a top face and a bottom face opposite the top face, the peripheral edge extending around a periphery of the workpiece between the top face and the bottom face;

wherein:

when the workpiece is supported in the first fixture, the top face of the workpiece is oriented for performing a first machining operation on the top surface of the workpiece; and when the workpiece is supported in the second fixture, the bottom face of the workpiece is oriented for performing a second machining operation on the top surface of the workpiece.

13. A fixturing system, according to claim 12, wherein:
there are exactly three fixture points in the first set of fixture points;
there are exactly three fixture points in the second set of fixture points; and
the first and second sets of fixture points engage exactly three edge features disposed around the peripheral edge of the workpiece.

14. A fixturing system, according to claim 12, wherein:
the first set of fixture points is identical to the second set of fixture points.

15. A fixturing system, according to claim 12, wherein:
the fixture points are disposed at established heights above a surface of a fixture base; and
the heights of the fixture points are established to ensure that the second machined surface of the workpiece will be parallel to the first machined surface of the workpiece.

16. A fixturing system, according to claim 12, wherein:
at least one of the first set of three fixture points is spherical, having a rounded "nose" for fully engaging a corresponding at least one of the edge features; and
at least one of the second set of three fixture points is spherical, having a rounded "nose" for fully engaging the corresponding at least one of the edge features.

17. A fixturing system, according to claim 12, wherein:
at least one of the first set of three fixture points is wedge-shaped, for partially engaging a corresponding at least one of the edge features; and
at least one of the second set of three fixture points is wedge-shaped, for partially engaging the corresponding at least one of the edge features.

18. A fixturing system, according to claim 12, wherein:
the edge features are tapered depressions in the peripheral edge of the workpiece.

19. A fixturing system, according to claim 12, wherein:
the edge features are conical.

20. A fixturing system, according to claim 19, wherein:
the edge features are wedge-shaped.

21. A fixturing system, according to claim 19, wherein:
there are exactly three edge features in the workpiece;
two of the three edge features are conical; and
a third of the three edge features is wedge-shaped.

22. A fixturing system, according to claim 19, wherein:
there are exactly three edge features in the workpiece;
two of the three edge features are wedge-shaped; and
a third of the three edge features is conical.

23. A fixturing system, according to claim 12, wherein:
two of the three fixture points in each of the first and second sets of fixture points is fixed to the fixture base, and the third of the fixture points in each of the first and second sets of fixture points is mounted for movement to the fixture base.

24. A fixturing system, according to claim 12, wherein:
the fixture points in each of the first and second sets of fixture points are mounted for movement to the fixture base.

25. A fixturing system, according to claim 12, further comprising:
at least one clamp-type device disposed at strategic locations along the edge of the workpiece to dampen chatter induced vibrations.

* * * * *